(12) United States Patent
Schmidt et al.

(10) Patent No.: US 7,025,673 B2
(45) Date of Patent: Apr. 11, 2006

(54) TAILINGS CONVEYOR SYSTEM

(75) Inventors: James Schmidt, Blue Grass, IA (US); Robert A. Matousek, Milan, IL (US)

(73) Assignee: CNH America LLC, Racine, WI (US)

( * ) Notice: Subject to any disclaimer, the term of this patent is extended or adjusted under 35 U.S.C. 154(b) by 91 days.

(21) Appl. No.: 10/340,263

(22) Filed: Jan. 10, 2003

(65) Prior Publication Data

US 2004/0266503 A1 Dec. 30, 2004

(51) Int. Cl.
*A01F 12/52* (2006.01)
*A23N 5/00* (2006.01)

(52) U.S. Cl. .................................... 460/114; 460/14

(58) Field of Classification Search ............ 460/14, 460/12, 13, 70, 76, 119, 114
See application file for complete search history.

(56) References Cited

U.S. PATENT DOCUMENTS

| | | | |
|---|---|---|---|
| 1,781,198 A | 11/1930 | Scranton, Jr. | |
| 3,324,860 A | 6/1967 | Kepray | 130/27 |
| 3,976,084 A | 8/1976 | Weber | 130/27 |
| 4,062,366 A | 12/1977 | De Coene | 130/27 |
| 4,292,981 A | 10/1981 | De Busscher et al. | 130/27 |
| 4,951,031 A | * 8/1990 | Strubbe | 340/684 |
| 5,497,605 A | 3/1996 | Underwood et al. | 56/14.6 |
| 5,980,382 A | * 11/1999 | Brantley et al. | 460/16 |
| 6,390,915 B1 | * 5/2002 | Brantley et al. | 460/131 |
| 6,669,558 B1 | * 12/2003 | Wolters et al. | 460/14 |

* cited by examiner

Primary Examiner—Árpád F. Kavács
(74) Attorney, Agent, or Firm—Rebecca Henkel

(57) ABSTRACT

An agricultural harvesting machine includes a tailings conveyor housing. The agricultural harvesting machine provides a cleaning device for cleaning threshed and separated grain. The tailings conveyor housing collects tailings from the cleaning device and propels the tailings with a first impeller against a first rethreshing member and radially to a second impeller. The second impeller propels the tailings against a second rethreshing member and radially to a third impeller. The third impeller propels the tailings against a third rethreshing member and radially through the second opening and past a baffle, where the tailings are redirected back to the cleaning device and spread out over the cleaning device.

25 Claims, 5 Drawing Sheets

TAILINGS CONVEYOR SYSTEM

BACKGROUND

The present invention herein relate generally to an agricultural harvesting machine and more particularly to a conveyor for tailings material in an agricultural harvesting machine.

Typically, an agricultural harvesting machine gathers crop from a field and transports the crop by means of a feeder house to a threshing and separating device located inside the agricultural harvesting machine such as a combine. The threshing and separating device delivers the crop to the cleaning system of the combine, which includes a plurality of sieves. An upper sieve allows clean grain and some material other than grain (MOG) to fall through it, and a lower sieve is adjusted so that only clean grain is allowed to pass through it. The material including the clean grain and MOG that falls through the upper sieve, but does not pass through the lower sieve, is called tailings. This material needs to be conveyed through the combine to be threshed and/or cleaned again.

Prior methods accomplish the threshing and/or cleaning of the tailings by conveying it to one side of the combine with an auger. The tailings is then carried by a conveyor, typically a paddle and chain conveyor, back to the combine threshing mechanism. Some combines have used a rethreshing device which is separate from the threshing system which helps save capacity on the threshing system by rethreshing the tailings separately from new crop coming into the combine. The auger feeds material into the rethreshing device and then the material is conveyed back to the cleaning system. Both single impeller/blowers and augers have been used to convey this material back to the cleaning system. These rethreshing devices are usually convertible, enabling the operator to manipulate the machine to be more or less aggressive, depending on the vulnerability of the grain to damage, during processing.

Prior methods for conveying the tailings material are inefficient in terms of throughput capacity and power consumption. Some known embodiments have resulted in large conveying devices that tend to limit access to both the combine and the conveying device for maintenance and conversion.

Therefore, what is needed is a more efficient means for conveying tailings, which allows greater access to the device and the combine, while performing the rethreshing function.

SUMMARY

One embodiment, accordingly, provides a triple impeller tailings conveyor which permits greater access and improves efficiency. To this end, a tailings conveyor includes a housing having a first opening. A first impeller is adjacent the first opening for receiving the tailings. A second impeller is positioned radially from the first impeller so that the tailings are propelled radially from the first impeller to the second impeller. A third impeller is located above the second impeller. A third impeller sits inside of a secondary housing at an angle to the second impeller that is defined by the geometry of the combine. The third is positioned relative to the top point of the second impeller with the exit point of the material being the side of the combine. The third impeller may rotate opposite of the bottom two impellers. As an alternative, the third impeller may rotate the same direction as the two bottom impellers. A second opening is provided in the housing radially adjacent to the third impeller so that the tailings are propelled from the third impeller through the second opening and into the side of the combine.

A principal advantage of this embodiment is that the tailings conveyor provides a more efficient means for conveying the tailings which allows greater access to the device and the combine, while performing the rethreshing function.

DETAILED DESCRIPTION OF THE PREFERRED EMBODIMENTS

Figure 1:
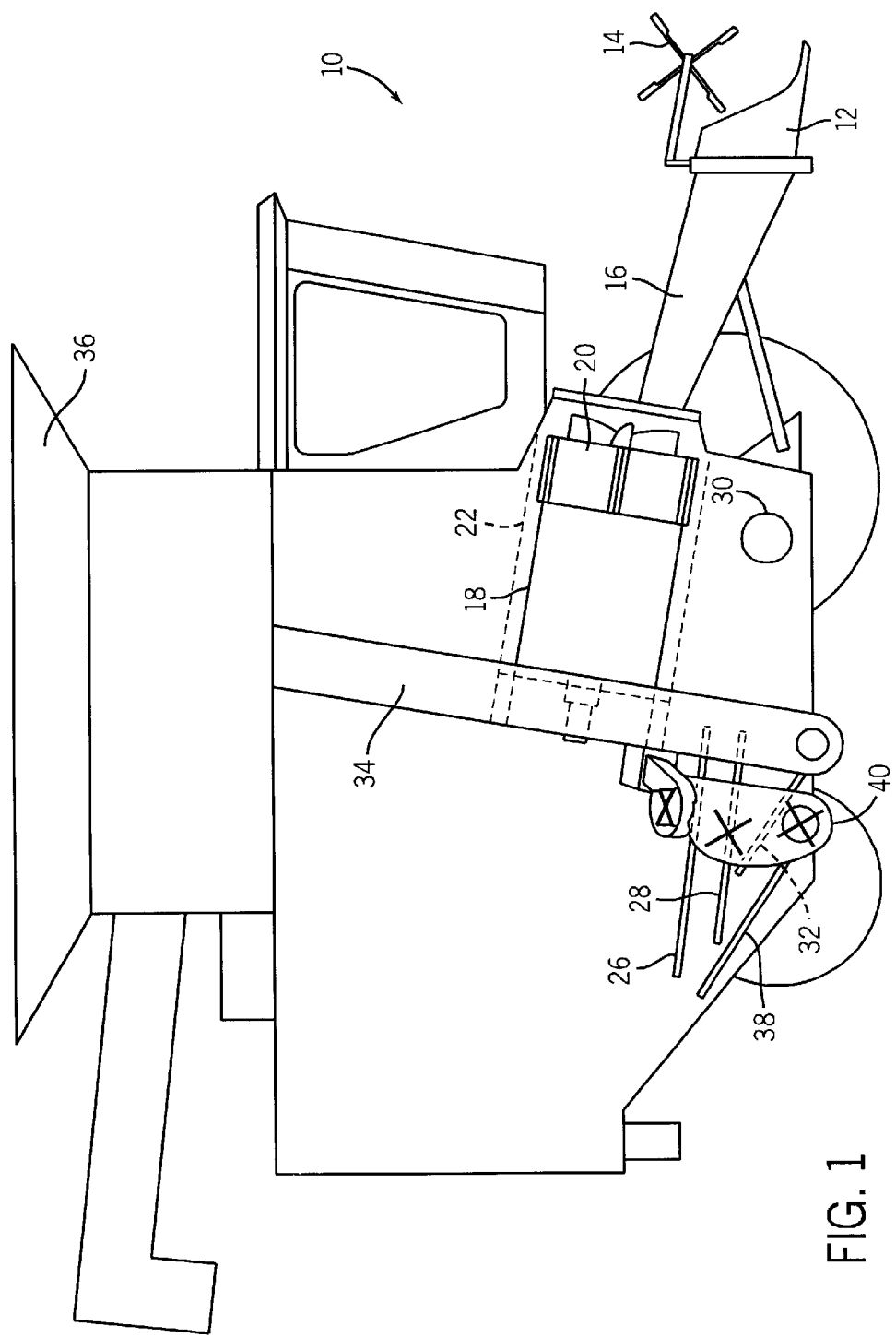
FIG. 1 is a side view illustrating an embodiment of the major components of an agricultural harvesting machine.
Figure 2:
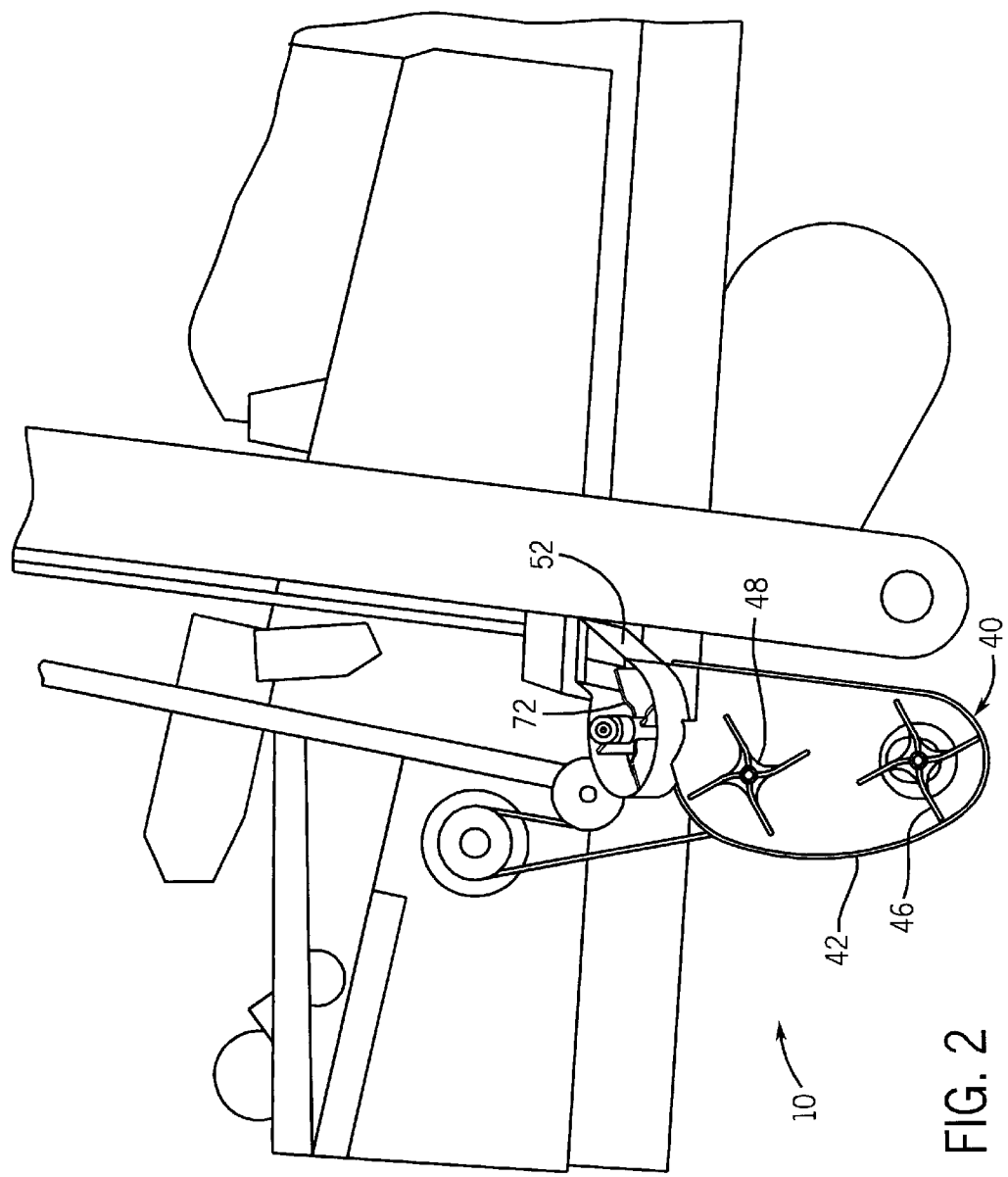
FIG. 2 is a more detailed view of the harvesting machine of FIG. 1 depicting an embodiment of a tailings conveyor housing within the machine.

Referring to FIG. 1, an agricultural harvesting machine 10, incorporating the principles of the instant invention, has a header 12, a reel 14, and a feeder 16. Crop material is collected by header 12 and reel 14 and taken into agricultural harvesting machine 10 through feeder 16 in a conventional manner.

A threshing assembly 18 includes a rotor 20 and a perforated housing 22. Rotor 20 is rotated within perforated housing 22. Crop is received from feeder 16 and is passed through clearances between rotor 20 and perforated housing 22 to thresh grain. Grain which is threshed in the clearances between housing 22 and rotor 20 falls through the perforations in housing 22 and is transported to a chaffer sieve 26 and a shoe sieve 28. Chaffer sieve 26 and shoe sieve 28 are members that oscillate back and forth. Sieves 26 and 28 have a plurality of apertures for allowing the properly threshed grain to fall through. A blower 30 blows air through sieves 26 and 28 and out the rear of agricultural harvesting machine 10. Chaff will be blown outward along with the air. The clean grain falls through sieves 26 and 28 onto an inclined plane 32. Clean grain travels along a plane 32 and then through a grain elevator 34, to a grain storage area 36.

Grain and material other than grain (MOG), which is too heavy to become air borne and falls through chaffer sieve 26 but does not pass through shoe sieve 28 is called tailings. Tailings end up on a plane 38 and are rethreshed and conveyed in a tailings conveyor 40 back up to chaffer sieve 26.

As in best seen in FIGS. 2–6, the tailings conveyor 40 includes a housing 42, a first opening 44, a first impeller 46, a second impeller 48, a third impeller (72) and a second opening 50. The first and second impellers 46 and 48, respectively, rotate on shafts, which have substantially parallel axes. The third impeller (72) may rotate the opposite direction or as alternative in the same direction as the bottom two impellers (72) and (72) respectively.

Figure 3:
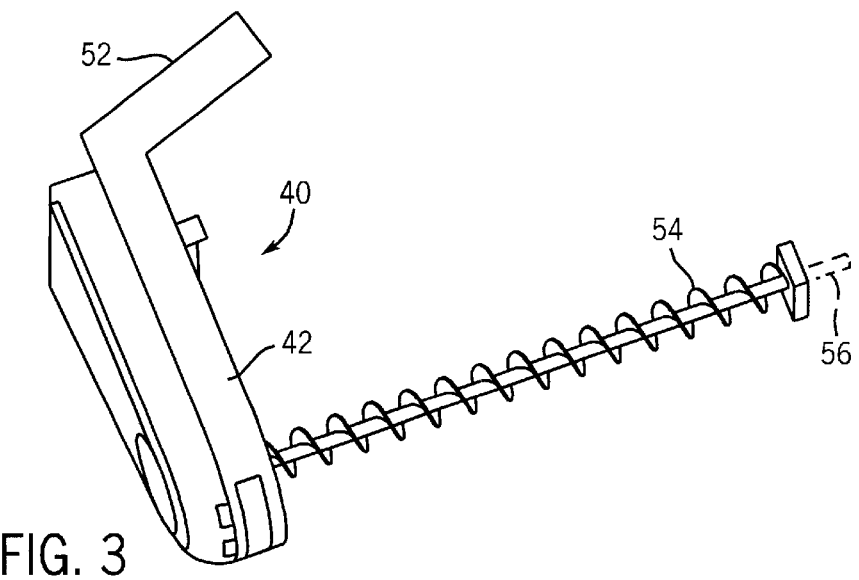
FIG. 3 is a perspective view of an embodiment of the housing of FIG. 2 including a feed auger.

The housing 42 receives the tailings by means of an auger 54, as depicted in FIG. 3. Auger 54, as shown FIGS. 4, 5 and 6, has an axis of rotation about a shaft 56 and first impeller 46 has an axis of rotation about a shaft 58 which is coaxial with shaft 56. Thus, the first opening 44 is aligned with the first and second shafts 56 and 58. As an alternative however, the first opening 44 can be offset at 44*a*, as shown in FIG. 6, from the shaft 58 so that the tailings are delivered adjacent a tip portion 46*a* of impeller 46.

Figure 4:
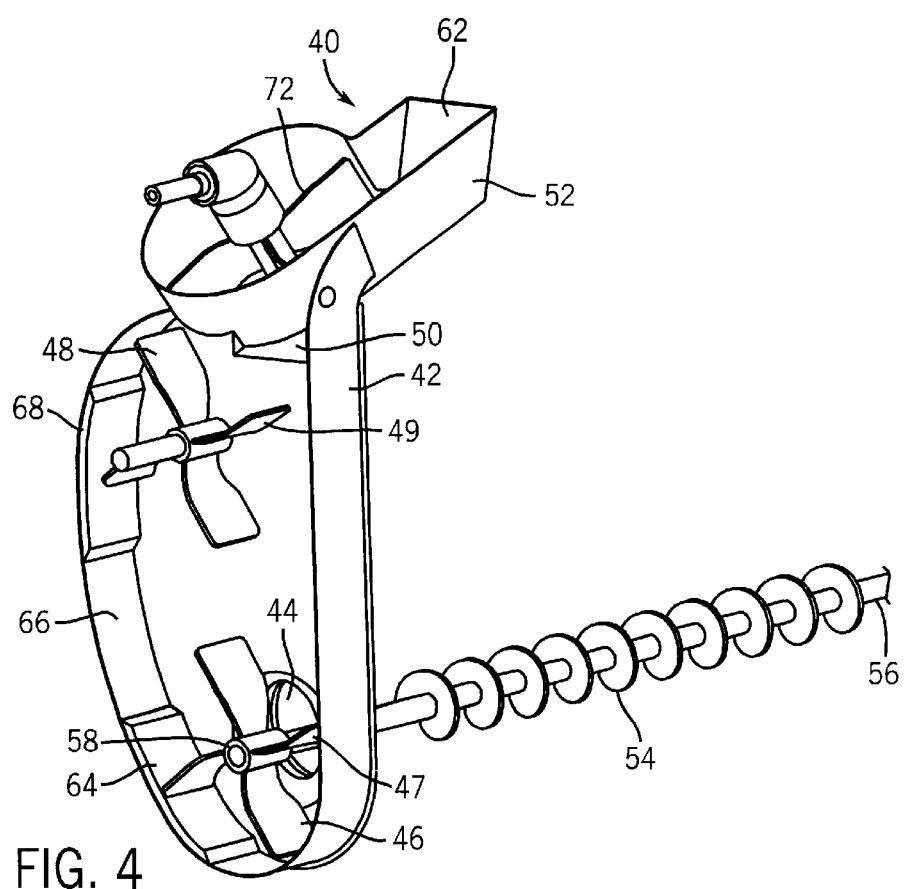
FIG. 4 is a perspective view of the tailings conveyor housing of FIG. 3.
Figure 6:
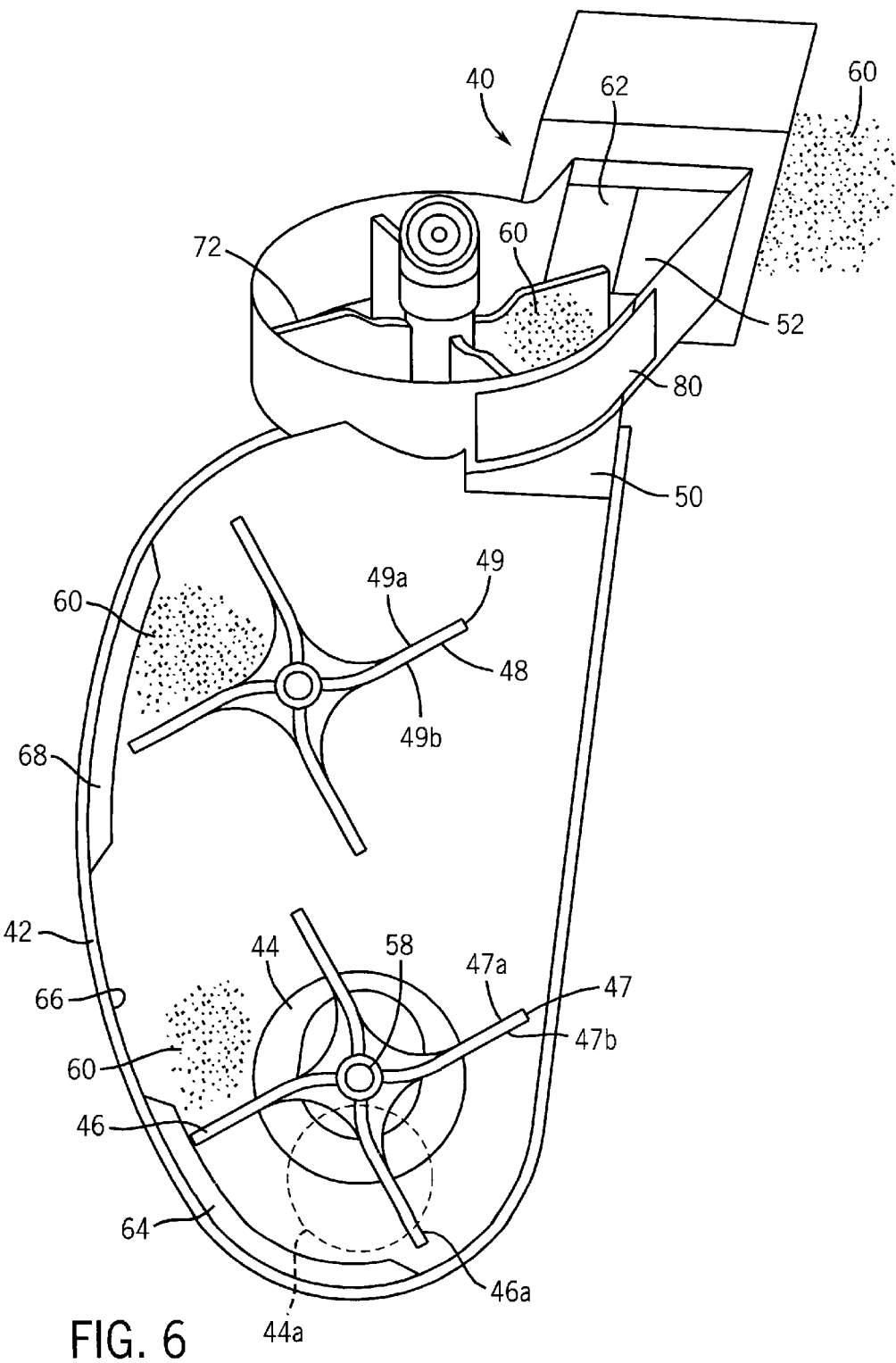
FIG. 6 is a frontal view of the tailings conveyor housing of FIG. 4.

The blades 47, FIGS. 4 and 6, of the first impeller 46, the blades 49 of the second impeller 48 and the blades of the third impeller 72 are curved or arcuate. As such, each blade 47 has a concave surface 47*a* and a convex surface 47*b*. Similarly, each blade 49 has a concave surface 49*a* and a convex surface 49*b*. Tailings 60 are propelled by rotating contact with the convex surfaces 47*b* and 49*b* of each impeller 47 and 49, respectively.

Figure 5:
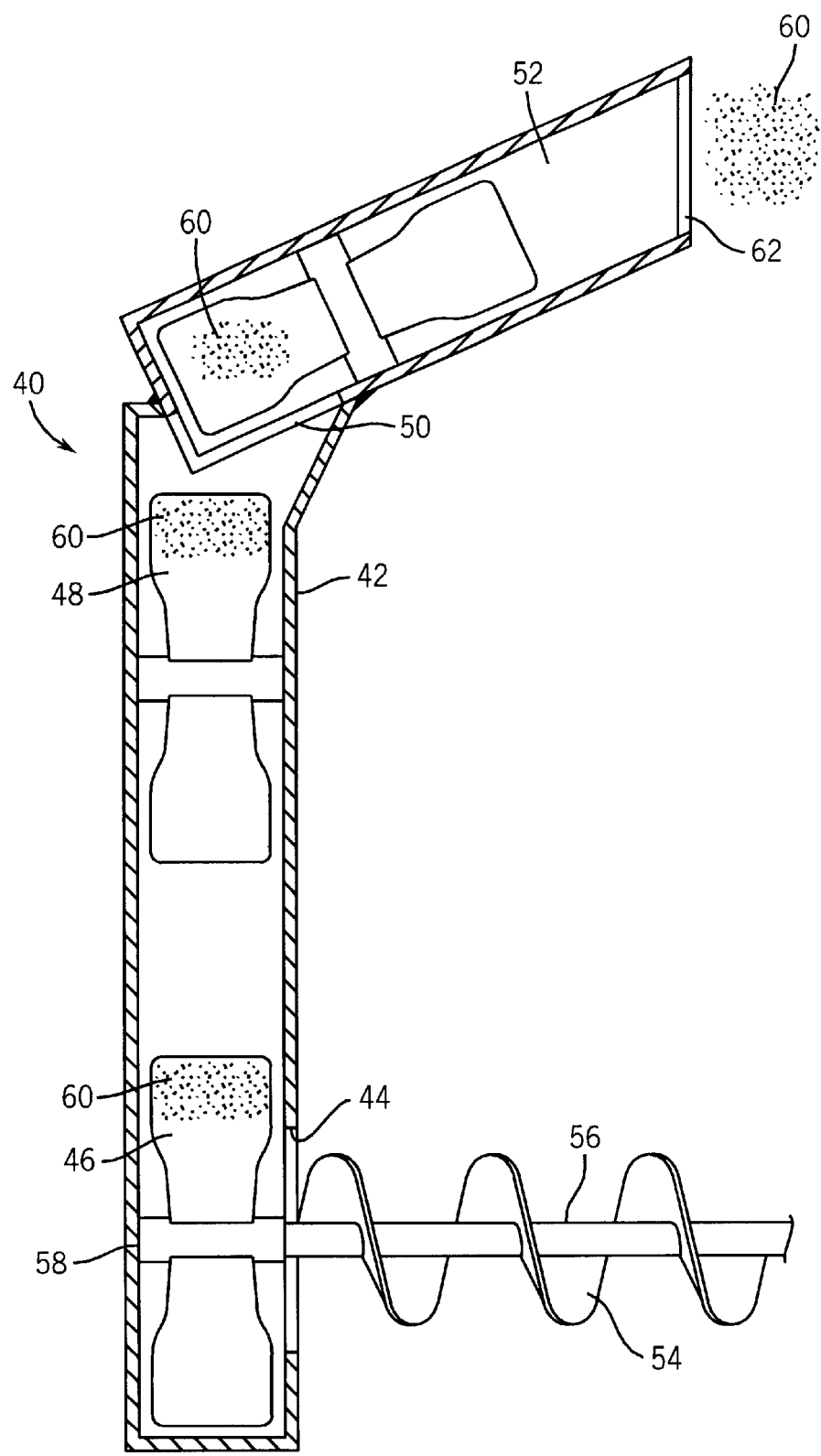
FIG. 5 is a side view of the tailings conveyor housing of FIG. 4.

The impellers 46, 48 and the second opening 50, FIGS. 4, 5 and 6, are radially in-line. That is, tailings 60 which enter housing 42 at opening 44, or 44*a*, are propelled radially from first impeller 46 to the radially adjacent second impeller 48. The tailings 60 are then propelled radially from second impeller 48 to the radially adjacent third impeller through second opening 50, as controlled by the geometry of the housing, after which, the third impeller 72 delivers the material to the conduit 52, after which the tailings 60 are directed by the conduit 52 to a conduit exit baffle 62, which functions as a means for spreading the tailings 60 as they exit the conduit 52.

The tailings 60 are also propelled by first impeller 46 against a first removable threshing plate 64, FIGS. 4 and 6, as the tailings move radially toward second impeller 48. A common housing wall 66 enhances the radial direction of travel from the first impeller 46 to the second impeller 48. The second impeller 48 then propels the tailings 60 against a second removable threshing plate 68 as the tailings 60 move radially toward the second opening 50. The third impeller 72 then propels the tailings against a third removable threshing plate. The direction of material flow is governed by the primary and secondary housings. A removable plate 80 is also depicted in FIG. 6.

The preferred rotation for both bottom impellers is clockwise. The preferred rotation of the top impeller is counter clockwise, however clockwise will also suffice. The arcuate blade shape causes a more aggressive threshing of material and forces the material to the outside of the impeller faster, which increases conveying capacity. The removable threshing plates may have a rough surface or be replaced by plates, which are smooth depending on the material being processed.

Although illustrative embodiments have been shown and described, a wide range of modification, change and substitution is contemplated in the foregoing disclosure and in some instances, some features of the embodiment may be employed without a corresponding use of other features. Accordingly, it is appropriate that the appended claims be construed broadly and in a manner consistent with the scope of the embodiments disclosed herein.

What is claimed is:

1. A tailings conveyor for use in an agricultural harvester comprising:
    a tailings conveyor housing;
    a first opening in the tailings conveyor housing;
    a first impeller in the tailings conveyor housing adjacent the first opening, whereby tailings are delivered through the first opening to the first impeller;
    a second impeller in the tailings conveyor housing positioned radially from the first impeller, whereby the tailings are propelled radially from the first impeller to the second impeller;
    a third impeller in the tailings conveyor housing positioned radially and angularly adjacent to the second impeller, whereby tailings are propelled radially from the second impeller to the third impeller;
    a second opening in the tailings conveyor housing positioned radially adjacent to the third impeller, whereby the tailings are propelled radially from the third impeller through the second opening; and
    a conduit extending from the second opening, whereby the tailings are propelled radially from the third impeller directly to the conduit via the second opening.

2. The tailings conveyor of claim 1, wherein the first impeller, the second impeller and the third impeller have arcuate blades.

3. The tailings conveyor of claim 1, wherein the first opening in the tailings conveyor housing is positioned coaxially with the first impeller.

4. The tailings conveyor of claim 1, wherein the tailings are delivered through the first opening in the tailings conveyor housing by an auger.

5. The tailings conveyor of claim 1, wherein the conduit includes a means for spreading out the tailings as they exit the conduit.

6. The tailings conveyor of claim 1, wherein the first impeller and the second impeller share a common wall in the tailings conveyor housing which guides the tailings from the first impeller to the second impeller.

7. The tailings conveyor of claim 1, wherein the tailings conveyor housing includes removable threshing plates adjacent each of the first, second and third impellers, whereby the tailings are rethreshed as they are conveyed through the tailings conveyor housing.

8. The tailings conveyor of claim 1, wherein the tailings are propelled from the second impeller to the third impeller back into the side of the combine through the second opening and past the conduit.

9. An agricultural harvesting machine comprising:
    a chassis;
    a means mounted on the chassis for feeding crop material thereto;
    a threshing, separating, and cleaning means mounted on the chassis for threshing and separating grain from the crop material, for cleaning threshed and separated grain and for separating tailings from the clean grain;
    a tailings conveyor housing mounted on the chassis;
    a first opening in the tailings conveyor housing;
    a first impeller in the tailings conveyor housing adjacent the first opening, whereby the tailings are delivered through the first opening to the first impeller;
    a second impeller in the tailings conveyor housing positioned radially from the first impeller, whereby the tailings are propelled radially from the first impeller to the second impeller;
    a third impeller in the tailings conveyor housing positioned radially and angularly to the second impeller, whereby tailings are propelled radially from the second impeller to the third impeller;
    a second opening in the tailings conveyor housing positioned radially adjacent to the third impeller, whereby tailings are propelled radially from the third impeller through the conduit via the second opening; and
    a conduit extending from the second opening, whereby the tailings are propelled radially from the third impeller directly to the conduit via the second opening.

10. The harvesting machine of claim 9, wherein the first impeller, the second impeller and the third impeller have arcuate blades.

11. The harvesting machine of claim 9, wherein the first opening in the tailings conveyor housing is positioned coaxially with the first impeller.

12. The harvesting machine of claim 9, wherein the tailings are delivered through the first opening in the tailings conveyor housing by an auger.

13. The harvesting machine of claim 9, wherein the first opening is offset from an axis of rotation of the first impeller such that the tailings are delivered adjacent a tip portion of the first impeller.

14. The harvesting machine of claim 9, wherein the conduit includes a means for spreading out the tailings as they exit the conduit.

15. The harvesting machine of claim 9, wherein the first impeller and the second impeller share a common wall in the tailings conveyor housing which guides tailings from the first impeller to the second impeller.

16. The harvesting machine of claim 9, wherein the tailings conveyor housing includes removable threshing plates adjacent each impeller, whereby the tailings are rethreshed as they are conveyed through the tailings conveyor.

17. The harvesting machine of claim 9, wherein the third impeller rotates opposite the bottom two impellers, within the tailings conveyor housing which guides the tailings from the second impeller to the third impeller and from the third impeller back into the side of the harvesting machine.

18. A method for conveying tailings in an agricultural harvesting machine comprising the steps of:

providing a chassis, including a tailings conveyor housing mounted on the chassis and having a first opening in the tailings conveyor housing and a first impeller in the tailings conveyor housing adjacent the first opening;

delivering tailings through the first opening to the first impeller;

propelling the tailings radially from the first impeller to a second impeller supported within said tailing conveyor housing and subsequently to a third impeller supported within said tailing conveyor housing;

further propelling the tailings from the third impeller radially through a second opening;

further propelling the tailings from the third impeller radially through a second opening in the tailing conveyor housing into a conduit in flow communication with the second opening.

19. The method of claim 18, further comprising:

providing the first impeller, the second impeller and the third impeller with arcuate blades.

20. The method of claim 18 further comprising:

positioning the first opening in the tailings conveyor housing coaxially with the first impeller.

21. The method of claim 18 further comprising:

providing an auger for feeding the tailings through the first opening to the first impeller.

22. The method of claim 18, wherein said step of further propelling in parts sufficient momentum to said tailing to exit the conduit into a storage area, said method further comprising the step of:

spreading out the tailings as said tailing exit the conduit.

23. An agricultural harvesting machine comprising:

a chassis;

a tailings conveyor housing mounted on the chassis;

a first opening in the tailings conveyor housing;

a first impeller in the tailings conveyor housing adjacent the first opening, whereby tailings are delivered through the first opening to the first impeller;

a second impeller in the tailings conveyor housing positioned radially from the first impeller, whereby the tailings are propelled radially from the first impeller to the second impeller;

a third impeller in the tailings conveyor housing positioned radially and angularly from the second impeller, whereby, the tailings are propelled radially from the second impeller to the third impeller;

a second opening in the tailings conveyor housing positioned radially adjacent to the third impeller, whereby the tailings are propelled radially from the third impeller through the second opening; and a conduit extending from the second opening, whereby the tailings are propelled radially from the third impeller directly to the conduit via the second opening.

24. The harvesting machine of claim 23 wherein the first, second and third impellers each have arcuate blades, each blade having a concave surface and a convex surface.

25. The harvesting machine of claim 24 wherein the tailings are propelled radially by rotating contact with the convex surfaces of the blades.

* * * * *